(12) United States Patent
Kouchi et al.

(10) Patent No.: US 6,661,557 B2
(45) Date of Patent: Dec. 9, 2003

(54) OPTICAL MODULATOR

(75) Inventors: Tsuyoshi Kouchi, Tokyo (JP); Takashi Mitsuma, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/302,222

(22) Filed: Nov. 22, 2002

(65) Prior Publication Data

US 2003/0123130 A1 Jul. 3, 2003

(30) Foreign Application Priority Data

Nov. 22, 2001 (JP) ........................................ 2001-356954
Jul. 23, 2002 (JP) ........................................ 2002-213501

(51) Int. Cl.$^7$ .............................. G02F 1/03; G02F 1/295
(52) U.S. Cl. ............................. 359/248; 359/245; 385/8
(58) Field of Search .............................. 359/248, 245; 385/1–3, 8, 131; 257/14, 80, 94, 96, 98, 101, 458

(56) References Cited

U.S. PATENT DOCUMENTS 5,825,525 A * 10/1998 Harwit ........................ 359/248
5,953,149 A * 9/1999 Ishizaka ...................... 359/248
6,002,510 A * 12/1999 Ishizaka ...................... 359/248
6,115,169 A * 9/2000 Takagi et al. ................ 359/248
6,198,853 B1 * 3/2001 Yamada ......................... 385/2

* cited by examiner

*Primary Examiner*—Georgia Epps
*Assistant Examiner*—Jack Dinh
(74) *Attorney, Agent, or Firm*—David N. Lathrop, Esq.; Gallagher & Lathrop

(57) ABSTRACT

There is provided an optical modulator in which positive holes produced in the valence band are not piled up, the electrostatic capacity can be decreased, the frequency response characteristic is improved, and which is capable of operating at a high speed. In an optical modulator comprising: an n-type clad layer; a stripe-like modulation layer elongated in the direction of light propagation and formed on the top surface of the n-type clad layer; a buffer layer formed on the top surface of the modulation layer; and a p-type clad layer formed on the top surface of the buffer layer, the buffer layer has its composition the band gap energy of which is higher by an energy due to a p-type acceptor level than that of the modulation layer, thereby to remove a difference in band gap energy between the modulation layer and the buffer layer.

8 Claims, 9 Drawing Sheets

(3) : BAND GAP ENERGY OF MODULATION LAYER (6) : ENERGY BY ACCEPTOR LEVEL (2) : BAND GAP ENERGY OF BUFFER LAYER ((2)=(3)+(6))

OPTICAL MODULATOR

BACKGROUND OF THE INVENTION

1. Field of the Invention

The present invention relates to an optical modulator for converting an electric signal into an optical or light signal, that is used in optical communication field, and more particularly, to an improvement in an optical absorption type semiconductor optical modulator.

2. Description of the Related Art

One example of the prior optical absorption type semiconductor optical modulator having a double-hetero structure is shown in FIG. 7 in outline construction thereof. The illustrated optical modulator comprises: an n-type clad layer (a layer of n-type InP in this example) 2 that is a generally rectangular substrate of 200 $\mu$m×300 $\mu$m in this example; a stripe-like modulation layer (a layer of non-doped InGaAsP in this example) 3 that is formed on the top surface of the n-type clad layer 2 at substantially the central portion thereof in the direction of the minor side (in the width direction); a stripe-like p-type clad layer (a layer of p-type InP in this example) 4 that is formed on the top surface of the modulation layer 3; semi-insulating (SI) buried layers (layers each of SI-InP in this example) 5 that are formed on the top surface of the n-type clad layer 2 at the both sides of a stripe-like lamination consisting of the modulation layer 3 and the p-type clad layer 4 in such manner that they are in contact with the corresponding side surfaces of the stripe-like lamination of the layers respectively and that they have the same height as that of the lamination of the layers; a p-electrode 7 that is formed on the top surface of the p-type clad layer 4; insulation layers 6 that are formed on the top surfaces of the buried layers 5 at the both sides of the p-electrode 7, respectively; a bonding pad 8 that is formed on the top surface of one of the insulation layers 6; and an n-electrode 1 that is formed on the bottom surface of the n-type clad layer 2.

The stripe-like lamination consisting of the modulation layer 3 and the p-type clad layer 4 (the widths of the modulation layer 3 and the p-type clad layer 4 are 2 $\mu$m and the lengths thereof are 200 $\mu$m in this example) are formed by forming the modulation layer 3 of a predetermined thickness on the whole top surface of the n-type clad layer 2, then forming the p-type clad layer 4 of a predetermined thickness on the whole top surface of the modulation layer 3, thereafter forming a stripe-like mask that is elongate in the direction of the minor side of the p-type clad layer 4 on the top surface of the p-type clad layer 4 at the central portion thereof by masking process, and removing by etching the modulation layer 3 and the p-type clad layer 4 except for the portions thereof covered by the stripe-like mask. After that, the buried layers 5 are formed on the top surface of the n-type clad layer 2 (except for the portion thereof on which the stripe-like lamination of the modulation layer 3 and the p-type clad layer 4 has been formed) until the height of the buried layers 5 becomes same as that of the stripe-like lamination of the layers. Then, the insulation layer 6 (for example, a layer of SiO$_2$) is formed on all of the top surface of the stripe-like lamination of the layers and the top surfaces of the buried layers 5, and only a portion of the insulation layer 6 corresponding to the top surface of the stripe-like lamination of the layers is removed by etching. A conductive material (conductor) is deposited on the top surface of the stripe-like lamination exposed as a result of the above etching process by use of a technique such as evaporation, sputtering or the like to form the p-electrode 7 and at the same time, the bonding pad 8 is formed on the top surface of the insulation layer 6 in position.

Further, in FIG. 7, though thickness of the n-type clad layer 2 is shown such that it is approximately twice the thickness of the buried layer 5, in practice, thickness of the n-type clad layer 2 is set to 70–80 $\mu$m and substantially corresponds to thickness of the optical modulator.

The optical modulator constructed as described above modulates light that is incident from one end surface of the modulation layer 3 by varying a voltage applied between the p-electrode 7 and the n-electrode 1 and emits the modulated light from the other end surface of the modulation layer 3 into the outside. For example, when the positive terminal of a signal source is connected to the n-electrode 1 of the optical modulator, the negative terminal of the signal source is connected to the p-electrode 7 (in fact, the bonding pad 8) of the optical modulator, and a desired ON/OFF (discontinuous) electric signal (or a pulse signal) is generated from the signal source, then a voltage (electric field) applied between the p-electrode 7 and the n-electrode 1 varies. As a result, the incident light that propagates through the modulation layer 3 is modulated whereby there can be generated a ON/OFF (discontinuous) light (optical) signal or optical signal the strength or intensity of which varies corresponding to the desired electric signal applied between the p-electrode 7 and the n-electrode 1.

In the optical modulator constructed as described above, if the p-n junction (position at which the p-type impurity and the n-type impurity are balanced) should not be created in the p-type clad layer 4 (that is, the p-n junction is created in the modulation layer 3), there occurs a problem that an optical loss grows larger. In practice, in case of forming the p-type clad layer 4 on the top surface of the modulation layer 3, it is a possibility that the p-type impurity is diffused into the modulation layer 3, and in such case, the p-n junction will be created in the modulation layer 3. In order to prevent such difflusion of the p-type impurity, in the prior art, between the modulation layer 3 and the p-type clad layer 4 is interposed a buffer layer formed of the same material (InP in this example) as that of the non-doped clad layer, thereby preventing the p-n junction from being created in the modulation layer 3.

FIG. 8 illustrates an end surface of one example of the prior optical modulator in which a buffer layer 9 is interposed between the modulation layer 3 and the p-type clad layer 4, and shows only the n-type clad layer 2, the modulation layer 3, the buffer layer 9, the p-type clad layer 4 and the semi-insulating buried layer 5 that are regions constituted by semiconductor materials. In the illustrated optical modulator, a stripe-like lamination of three-layer structure that comprises the stripe-like modulation layer 3, the buffer layer 9 formed on the top surface of the stripe-like modulation layer 3, and the p-type clad layer 4 formed on the top surface of the buffer layer 9 is formed on the top surface of the n-type clad layer 2 that is the n-type InP substrate. One example of thickness of each of these layers is as follows. As shown in FIG. 8, thickness of the n-type clad layer 2 is 70–80 $\mu$m, thickness of the modulation layer 3 is 0.27 $\mu$m, thickness of the buffer layer 9 is 0.10 $\mu$m, and thickness of the p-type clad layer 4 is 2.00 $\mu$m. Therefore, thickness of the semi-insulating buried layer 5 is the sum (2.37 $\mu$m) of the modulation layer 3 (0.27 $\mu$m), the buffer layer 9 (0.10 $\mu$m) and the p-type clad layer 4 (2.00 $\mu$m).

With the construction as described above, in case of forming the p-type clad layer 4, it is a strong possibility that the p-type impurity will be difflused into the buffer layer 9, but it is not diff-used into the modulation layer 3. As a result, the p-n junction is created in the buffer layer 9, and there is no possibility that it gets in the modulation layer 3. Accordingly, the shortcoming that optical loss grows larger can be eliminated. Further, in FIG. 8, a direction in thickness from the p-type clad layer 4 that is the uppermost layer of the optical modulator toward the n-type clad layer 2 that is the lowermost layer thereof is defined to X as shown in FIG. 8 by an arrow.

Materials and band gap energies of the above-mentioned layers are shown in the following Table 1. Here, the band gap energies of the p-type clad layer 4, the buffer layer 9, the modulation layer 3 and the n-type clad layer 2 are shown by (1'), (2'), (3') and (4'), respectively.

TABLE 1

| Name | Material | Band Gap Energy [meV] | Remarks (Dopant) |
|---|---|---|---|
| p-type clad layer | p-InP | (1') 1350 | Zn |
| buffer layer | InP | (2') 1350 | |
| modulation layer | InGaAsP | (3') 832 | |
| n-type clad layer | n-InP | (4') 1350 | Se |

The position of the p-n junction depends upon how the dopant (p-type impurity) diffused into the p-type clad layer 4 is thermally difflused into the buffer layer 9. In general, Zn is used as a p-type impurity to be diffused into a material such as InP or the like that is frequently utilized in order to form an element used in optical communication. However, as Zn is much easy to thermally diffuse, it is highly difficult to control the position of the p-n junction, and hence there is a difficulty that the position of the p-n junction is greatly influenced by the manufacturing process. For this reason, thickness of the buffer layer 9 is set to have such sufficient thickness that the p-n junction is always produced in the buffer layer 9.

An energy band diagram relative to the thickness direction X of the optical modulator in which the band gap energy and thickness of each layer are set as mentioned above and the materials shown in Table 1 are used, is as shown in FIG. 9, for example. As is clear from this energy band diagram, in the prior optical modulator shown in FIG. 8, during the formation of the p-type clad layer 4, the p-type impurity Zn is diffused through the p-type clad layer 4 into only the buffer layer 9 (not diffused into the modulation layer 3), and hence the p-n junction is created in the buffer layer 9. Accordingly, the drawback that an optical loss grows larger can be removed.

As shown in Table 1, the band gap energies of the p-type clad layer 4 and the buffer layer 9 are set to 1350 meV since they utilize the same base material InP, and the band gap energy of the modulation layer 3 is set to 832 meV. Therefore, a difference in the band gap energy between the buffer layer 9 and the modulation layer 3 comes to 518 meV so that there exists a much greater discontinuity in the inclination of the band gap energy. On the other hand, a depletion layer is produced at both sides of the p-n junction. For this reason, if the p-n junction is produced in the buffer layer 9, as shown in FIG. 9, an energy region of high level (about 400 meV) is produced in the neighborhood of the interface between the buffer layer 9 and the modulation layer 3 in the valence band VB, which results in a difference in energy level that is steep in inclination formed between the interface between the buffer layer 9 and the modulation layer 3 and the p-n junction. Further, in the optical modulator shown in FIG. 8, only the modulation layer 3 contributes to optical absorption.

As is well known, when light is absorbed in the modulation layer 3, positive holes are produced in the valence band VB and electrons are produced in the conduction band CB. Electrons produced in the conduction band CB move toward the n-type clad layer 2 without any obstruction. On the other hand, positive holes produced in the valence band VB are prevented from being moved by the difference in energy level that is steep in inclination formed between the interface between the buffer layer 9 and the modulation layer 3 and the p-n junction, and hence they cannot be moved toward the p-type clad layer 4. As a result, as shown in the figure, the positive holes are piled up at the interface between the buffer layer 9 and the modulation layer 3 and the neighborhood thereof. Such phenomenon is called pileup phenomenon or effect of carrier (positive hole in this example). When the positive holes are piled up (such pileup phenomenon arises) in this manner, the voltage (electric field) applied to the optical modulator is canceled out and hence the efficiency of optical absorption is lowered so that ON and OFF of an electric signal cannot be faithfully converted into high intensity optical signal and low intensity optical signal corresponding thereto. Accordingly, the signal waveform in modulating operation is deteriorated, which results in disadvantages that an electric signal cannot be correctly converted into an optical signal, there appears a voltage dependence in the frequency response characteristic, and the like.

In order to make gentle the difference in energy level that is steep in inclination as described above, there is also provided an optical modulator in which a layer having its band gap energy gradually varied is interposed between the modulation layer 3 and the buffer layer 9, such layer being called "pileup preventing layer" in this technical field. Concretely, since the pileup preventing layer is provided for the purpose of eliminating the difference in band gap energy between the modulation layer 3 and the buffer layer 9, the band gap energy of the pileup preventing layer varies from the band gap energy of the modulation layer 3 to the band gap energy of the buffer layer 9.

FIG. 10 illustrates an end surface of one example of the prior optical modulator in which a pileup preventing layer 10 is interposed between the modulation layer 3 and the buffer layer 9, and shows only the n-type clad layer 2, the modulation layer 3, the pileup preventing layer 10, the buffer layer 9, the p-type clad layer 4 and the semi-insulating buried layer 5 that are regions constituted by semiconductor materials. In the illustrated optical modulator, a stripe-like lamination of four-layer structure that comprises the stripe-like modulation layer 3, the pileup preventing layer 10 formed on the top surface of the stripe-like modulation layer 3, the buffer layer 9 formed on the top surface of the pileup preventing layer 10, and the p-type clad layer 4 formed on the top surface of the buffer layer 9 is formed on the top surface of the n-type clad layer 2 that is the n-type InP substrate.

One example of thickness of each of these layers is as follows. As shown in FIG. 10, thickness of the n-type clad layer 2 is 70–80 $\mu$m, thickness of the modulation layer 3 is 0.25 $\mu$m, thickness of the pileup preventing layer 10 is 0.05 $\mu$m, thickness of the buffer layer 9 is 0.10 $\mu$m, and thickness of the p-type clad layer 4 is 2.00 $\mu$m. Therefore, thickness of the semi-insulating buried layer 5 is the sum (2.4 $\mu$m) of the modulation layer 3 (0.25 $\mu$m), the pileup preventing layer 10 (0.05 $\mu$m), the buffer layer 9 (0.10 $\mu$m) and the p-type clad layer 4 (2.00 $\mu$m). Further, in FIG. 10, a direction in thickness from the p-type clad layer 4 that is the uppermost layer of the optical modulator toward the n-type clad layer 2 that is the lowermost layer thereof is defined to X as shown in FIG. 10 by an arrow.

Materials and band gap energies of the above-mentioned layers are shown in the following Table 2. Here, the band gap energies of the p-type clad layer 4, the buffer layer 9, the pileup preventing layer 10, the modulation layer 3 and the n-type clad layer 2 are shown by (1'), (2'), (5'), (3') and (4'), respectively. Further, the band gap energy of the pileup preventing layer 10 can be varied from 850 meV to 1350 meV in an inclination manner by changing the ratio of the composition of InGaAsP.

TABLE 2

| Name | Material | Band Gap Energy [meV] | Remarks (Dopant) |
| --- | --- | --- | --- |
| p-type clad layer | p-InP | (1') 1350 | Zn |
| buffer layer | InP | (2') 1350 | |
| pileup preventing layer | InGaAsP | (5') 850–1350 | |
| modulation layer | InGaAsP | (3') 850 | |
| n-type clad layer | n-InP | (4') 1350 | Se |

As is clear from the above Table 2, the material InGaAsP of the pileup preventing layer 10 is the same as that of the modulation layer 3 and has the band gap energy (5') thereof varied from the energy (850 meV) of the modulation layer 3 to the band gap energy (1350 meV) of the buffer layer 9 in an inclination manner.

An energy band diagram relative to the thickness direction X of the optical modulator in which the band gap energy and thickness of each layer are set as mentioned above and the materials shown in Table 2 are used, is as shown in FIG. 11, for example. In this case, too, the p-n junction is produced in the buffer layer 9 and a depletion layer is produced at both sides of the p-n junction. When the p-n junction is produced in the buffer layer 9, an energy region of high level (about 400 meV) is produced in the neighborhood of the interface between the pileup preventing layer 10 and the modulation layer 3 in the valence band VB. However, since the band gap energy (5') of the pileup preventing layer 10 has varied from the band gap energy (3') of the modulation layer 3 to the band gap energy (2') of the buffer layer 9 in an inclination manner, there is produced a difference in energy level that is comparatively gentle in inclination as shown in FIG. 11 between the interface between the pileup preventing layer 10 and the modulation layer 3 and the p-n junction.

In this manner, in the prior optical modulator shown in FIG. 10, the inclination of the difference in energy level that is produced between the p-n junction and the interface between the pileup preventing layer 10 and the modulation layer 3 comes to gentle to some degree as compared with the prior optical modulator shown in FIG. 8, and hence positive holes produced in the valence band VB are easy to move toward the p-type clad layer 4. As a result, the number of positive holes piled up at the interface between the pileup preventing layer 10 and the modulation layer 3 and the neighborhood thereof is decreased to some degree. Further, in the optical modulator shown in FIG. 10, like the optical modulator shown in FIG. 8, only the modulation layer 3 contributes to optical absorption.

In the prior optical modulator shown in FIG. 10, it is possible that the depletion layer created due to the p-n junction has a sufficient width because thickness of the modulation layer 3 is 0.25 μm, thickness of the pileup preventing layer 10 is 0.05 μm and thickness of the buffer layer 9 is 0.10 μm. Accordingly, in case such structure of the optical modulator is adopted, the width of the depletion layer is increased and hence the electrostatic capacity of the optical modulator can be reduced to the extent that the optical modulator can operate sufficiently at a high speed. However, in the prior optical modulator shown in FIG. 10, the pileup preventing layer 10 has to be an inclined composition layer the band gap energy of which varies continuously and gently from that of the composition InGaAsP of the modulation layer 3 to that of the composition InP of the buffer layer 9. In this manner, since the inclined composition layer must have the composition InP that is the same as that of the buffer layer 9, in case of forming the inclined composition layer, a minute flow control for each of the materials Ga and As is required as the composition thereof approaches the composition InP, and so it is very difficult to manufacture the inclined composition layer with high reproducibility. In addition, in the WDM (Wavelength Division Multiplexing) communications, various kinds of optical wavelengths are used, and hence it is required to provide an optical modulator adapted to have good optical absorption characteristic to each of these optical wavelengths. To that end, there will be prepared optical modulators in which the band gap energies of the modulation layers 3 are properly changed for the respective optical wavelengths (energies). In the optical modulators having their modulation layers 3 that are different in the band gap energy from each other, a difference in energy level between the modulation layer 3 and the buffer layer 9 is different from one optical modulator to one optical modulator, which results in a disadvantage that it is much difficult to equally apply the pileup preventing effect to all of the optical modulators for the respective optical wavelengths.

SUMMARY OF THE INVENTION

It is an object of the present invention to provide an optical modulator in which a difference in energy level is hardly produced even the position of the p-n junction is not uniform, and hence positive holes produced in the valence band are prevented from being piled up.

It is another object of the present invention to provide an optical modulator that is capable of operating at a high speed, in which the width of a depletion layer can be widen to reduce the electrostatic capacity even the position of the p-n junction is not uniform.

It is further object of the present invention to provide an optical modulator that is able to improve the efficiency of optical coupling and the efficiency of optical absorption between an optical fiber and the optical modulator.

In order to accomplish the foregoing objects, in a first aspect of the present invention, there is provided an optical modulator which comprises: an n-type clad layer of a predetermined shape; a stripe-like modulation layer that is elongated in the direction of light propagation and is formed on the top surface of the n-type clad layer; a stripe-like buffer layer that is formed on the top surface of the stripe-like modulation layer; a stripe-like p-type clad layer that is formed on the top surface of the stripe-like buffer layer and has a p-type acceptor level; and wherein the buffer layer has its composition the band gap energy of which is higher by an energy due to the p-type acceptor level than the band gap energy of the modulation layer.

In a second aspect of the present invention, there is provided an optical modulator which comprises: an n-type clad layer of a predetermined shape; a stripe-like modulation layer that is elongated in the direction of light propagation and is formed on the top surface of the n-type clad layer; a stripe-like pileup preventing layer the band gap energy of which varies in inclination manner and that is formed on the top surface of the stripe-like modulation layer; a stripe-like buffer layer that is formed on the top surface of the stripe-like pileup preventing layer; a stripe-like p-type clad layer that is formed on the top surface of the stripe-like buffer layer; and wherein the band gap energy of the buffer layer is set to a value lower than the band gap energy of the p-type clad layer and higher than the band gap energy of the modulation layer.

In a third aspect of the present invention, there is provided an optical modulator wherein in the optical modulator set forth in the above first aspect or second aspect of the invention, an n-type layer is provided between the modulation layer and the n-type clad layer, the band gap energy of said n-type layer being higher by a level formed by a p-type impurity than the band gap energy of the modulation layer, or alternatively, a non-doped layer is provided between the modulation layer and the n-type clad layer, the band gap energy of said n-type layer being higher by a level formed by a p-type impurity than the band gap energy of the modulation layer, or alternatively, two layers of an n-type layer and a non-doped layer are provided between the modulation layer and the n-type clad layer, the band gap energy of said two layers being higher by a level formed by a p-type impurity than the band gap energy of the modulation layer.

With the construction as described above, since a difference in energy level is hardly produced even the position of the p-n junction is not uniform, positive holes produced in the valence band can be moved substantially freely toward the p-type clad layer. Accordingly, it is possible to provide an optical modulator in which the positive holes are prevented from being piled up. In addition, since the width of a depletion layer can be widen even the position of the p-n junction is not uniform, the electrostatic capacity is decreased, and hence it is possible to provide an optical modulator capable of operating at a high speed such as 40 Gbps. Moreover, since a distribution of the refractive index of a lamination of the layers in the direction of layer-built can be made symmetrical in top and bottom thereof, the distribution of mode field of a propagating light becomes symmetrical, and the center of the distribution corresponds to the position of the optical absorption layer (modulation layer). Accordingly, it is possible to provide an optical modulator that is able to improve the efficiency of optical coupling and the efficiency of optical absorption between an optical fiber and the optical modulator.

DETAILED DESCRIPTION OF THE PREFERRED EMBODIMENTS

The preferred embodiments of the present invention will now be described in detail with reference to FIGS. 1 to 6. The present invention may, however, be embodied in many different forms and should not be construed as limited to the embodiments set forth hereinafter; rather, the embodiments are provided so that this disclosure will be thorough and complete, and will fully convey the scope of the invention to those skilled in the art.

At first, a first embodiment of the optical modulator according to the present invention will be discussed in detail with reference to FIGS. 1 to 3.

Figure 1:
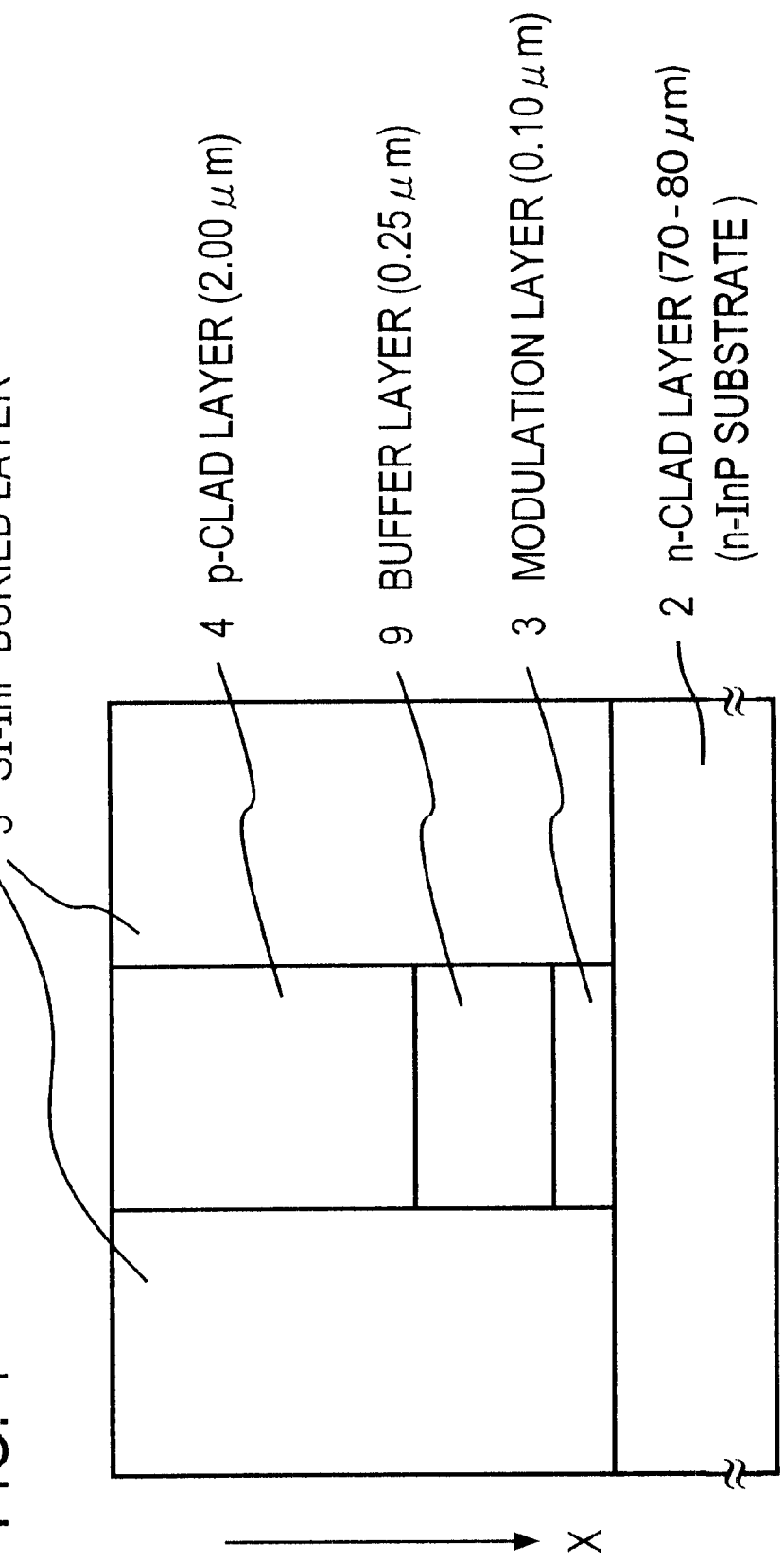
FIG. 1 is an end surface view showing the general construction of a first embodiment of the optical modulator according to the present invention.
Figure 8:
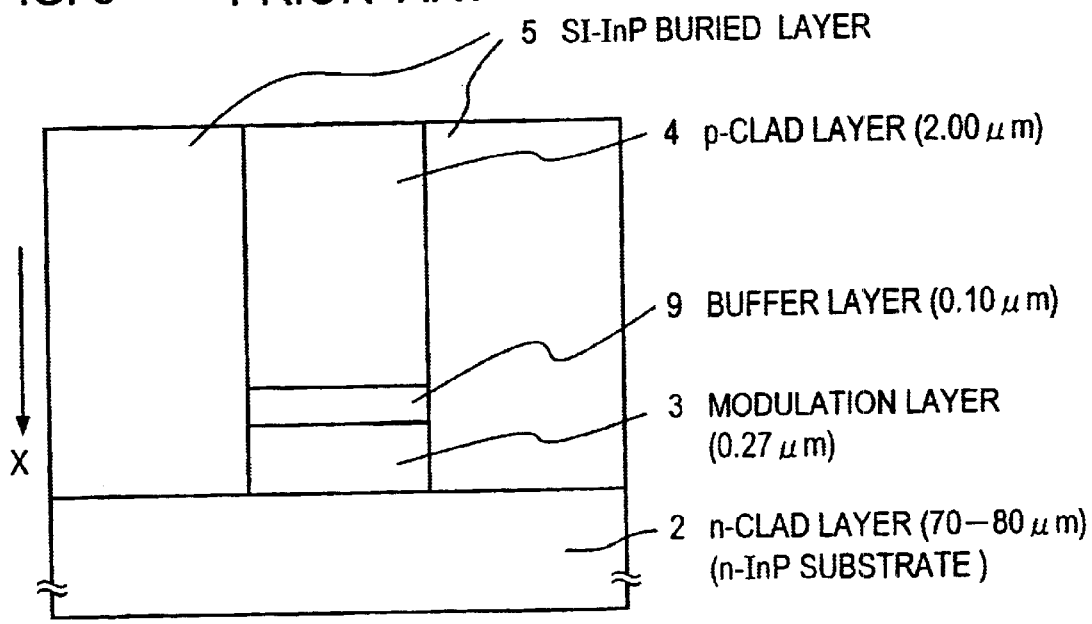
FIG. 8 is an end surface view showing regions constituted by semiconductor materials of the prior optical modulator shown in FIG. 7.
Figure 9:
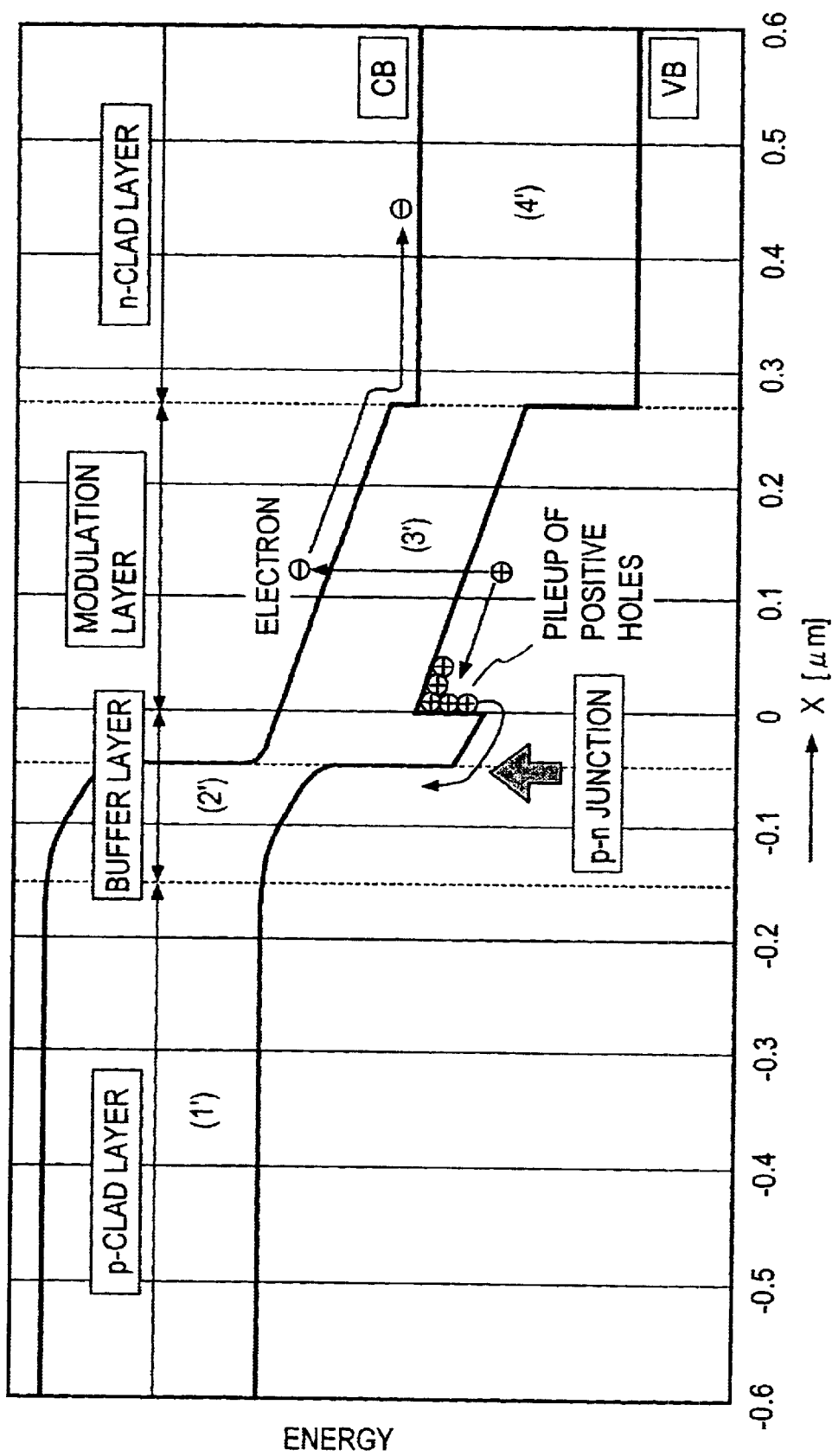
FIG. 9 is an energy band diagram of the prior optical modulator shown in FIG. 7.

FIG. 1 is an end surface view showing the general construction of the first embodiment of the optical modulator according to the present invention, and shows only an n-type clad layer 2, a modulation layer 3, a buffer layer 9, a p-type clad layer 4 and a semi-insulating buried layer 5 that are regions constituted by semiconductor materials. Like the prior optical modulator shown in FIG. 8, in the illustrated optical modulator, a stripe-like lamination of three-layer structure that comprises the stripe-like modulation layer 3, the buffer layer 9 formed on the top surface of the stripe-like modulation layer 3, and the p-type clad layer 4 formed on the top surface of the buffer layer 9 is formed on the top surface of the n-type clad layer 2 that is the n-type InP substrate. Further, in FIG. 1, a direction in thickness from the p-type clad layer 4 that is the uppermost layer of the optical modulator toward the n-type clad layer 2 that is the lowermost layer thereof is defined to X as shown in FIG. 1 by an arrow.

One example of thickness of each of these layers is as follows. As shown in FIG. 1, thickness of the n-type clad layer 2 is 70–80 $\mu$m that is the same as that of the prior optical modulator, thickness of the modulation layer 3 is 0.10 $\mu$m that is different from that of the prior optical modulator, thickness of the buffer layer 9 is 0.25 $\mu$m that is also different from that of the prior optical modulator, and thickness of the p-type clad layer 4 is 2.00 $\mu$m that is the same as that of the prior optical modulator. Therefore, thickness of the semi-insulating buried layer 5 is the sum (2.35 $\mu$m) of the modulation layer 3 (0.10 $\mu$m), the buffer layer 9 (0.25 $\mu$m) and the p-type clad layer 4 (2.00 $\mu$m), which is nearly the same as that of the prior optical modulator. Dopants are Zn and Se that are the same as those of the prior optical modulator.

Materials and band gap energies of the above-mentioned layers are shown in the following Table 3. Here, the band gap energies of the p-type clad layer 4, the buffer layer 9, the modulation layer 3 and the n-type clad layer 2 are shown by (1), (2), (3) and (4), respectively.

TABLE 3

| Name | Material | Band Gap Energy [meV] | Remarks (Dopant) |
| --- | --- | --- | --- |
| p-type clad layer | p-InP | (1) 1350 | Zn |
| buffer layer | InGaAsP | (2) 865 | |
| modulation layer | InGaAsP | (3) 832 | |
| n-type clad layer | n-InP | (4) 1350 | Se |

From the above Table 3, it will be comprehended that in the first embodiment of the optical modulator, the modulation layer 3 and the buffer layer 9 are formed of the same material (InGaAsP), and that the band gap energy (3) of the modulation layer 3 is somewhat lower (by 33 meV) than that (2) of the buffer layer 9. Further, as already described, the band gap energy of a layer formed of InGaAsP can be varied by changing the ratio of the composition of InGaAsP.

In case of using Se and Zn as an n-type dopant and a p-type dopant respectively, an acceptor level by the p-type dopant Zn is about 33 meV, the acceptor level being produced in the band gap energy (2) of the buffer layer 9 due to difflusion of Zn into the buffer layer 9. Since the band gap energy (3) of the modulation layer 3 is 832 meV, the band gap energy (2) of the buffer layer 9 is the sum of the band gap energy (3) of the modulation layer 3 and the acceptor level produced by the p-type dopant Zn. Accordingly, the band gap energy (2) of the buffer layer 9 becomes 865 meV as shown in Table 3. The relationship of the band gap energies between the modulation layer 3 and the buffer layer 9 discussed above is shown in FIG. 3.

Figure 2:
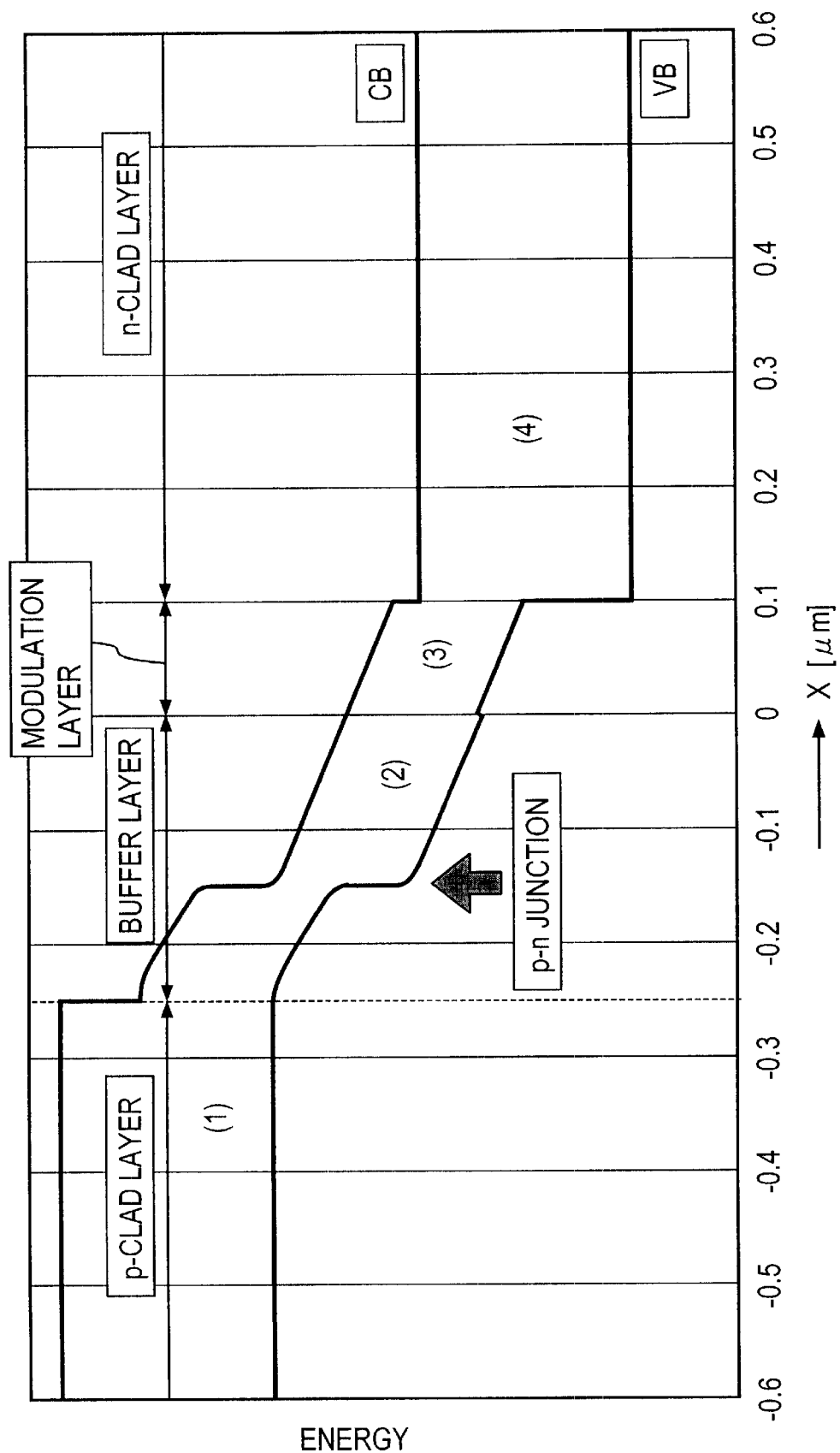
FIG. 2 is an energy band diagram of the first embodiment of the optical modulator shown in FIG. 1.
Figure 3:
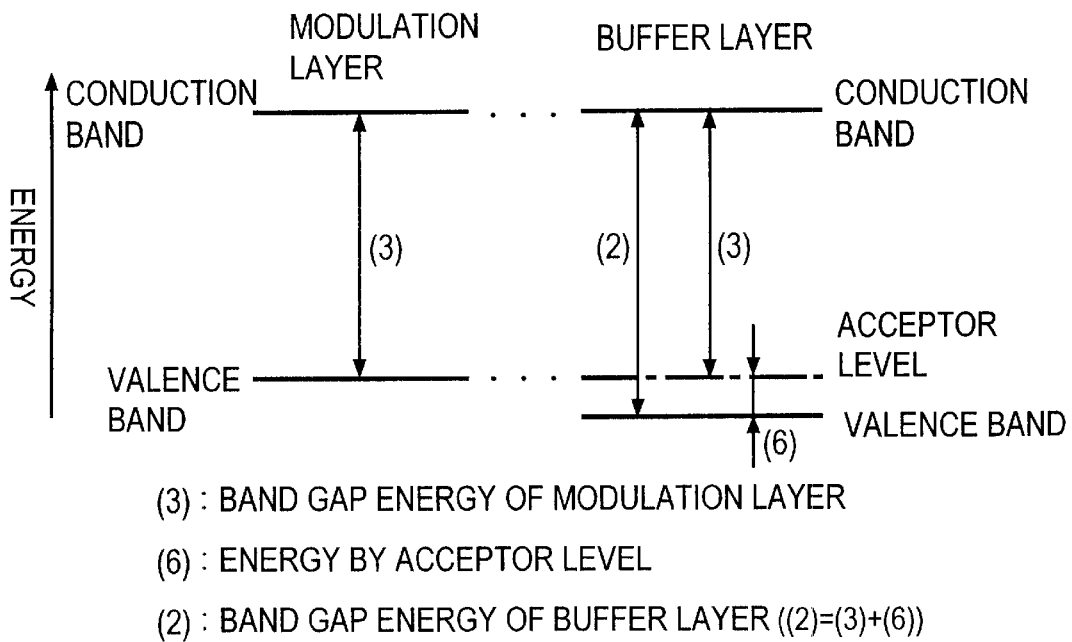
FIG. 3 is an illustration for explaining the relationship of the band gap energies between the modulation layer and the buffer layer of the first embodiment of the optical modulator.

An energy band diagram relative to the thickness direction X of the optical modulator in which the band gap energy and thickness of each layer are set as mentioned above and the materials shown in Table 3 are used, is as shown in FIG. 2, for example. As is clear from this energy band diagram, in the first embodiment of the optical modulator shown in FIG. 1, the p-n junction is created in the buffer layer 9 near the interface between the buffer layer 9 and the p-type clad layer 4. Moreover, unlike the prior optical modulator shown in FIG. 8, no energy region of high level is produced at the neighborhood of the interface between the buffer layer 9 and the modulation layer 3 in the valence band VB, and hence a difference in energy level that is steep in inclination cannot be created between the interface between the buffer layer 9 and the modulation layer 3 and the p-n junction. As a result, positive holes produced in the valence band VB freely move toward the p-type clad layer 4 since any difference in energy level is substantially not formed between the interface between the buffer layer 9 and the modulation layer 3 and the p-n junction. Of course, electrons produced in the conduction band CB move toward the n-type clad layer 2 without any obstruction.

In this manner, since the positive holes produced in the valence band VB are not piled up at the interface between the buffer layer 9 and the modulation layer 3 and the neighborhood thereof, the drawback that the voltage (electric field) applied to the optical modulator is canceled out is removed. Accordingly, the efficiency of optical absorption is increased so that ON and OFF of an electric signal can faithfully be converted into high intensity optical signal and low intensity optical signal or ON and OFF of an optical signal corresponding thereto. Consequently, the disadvantages of the prior optical modulator that the signal waveform in modulating operation is deteriorated, an electric signal cannot be correctly converted into an optical signal, there appears a voltage dependence in the frequency response characteristic, and the like are all removed.

Furthermore, since the p-n junction is created in the buffer layer 9 near the interface between the buffer layer 9 and the p-type clad layer 4, the width of a depletion layer is widened and the electrostatic capacity of the optical modulator is decreased. Accordingly, an optical modulator operating at a high speed such as 40 Gbps can be obtained, and will be used in, for example, high-speed, high-capacity optical fiber communications. Further, in the first embodiment of the optical modulator shown in FIG. 2, the modulation layer 3 and the buffer layer 9 contribute to optical absorption.

Figure 4:
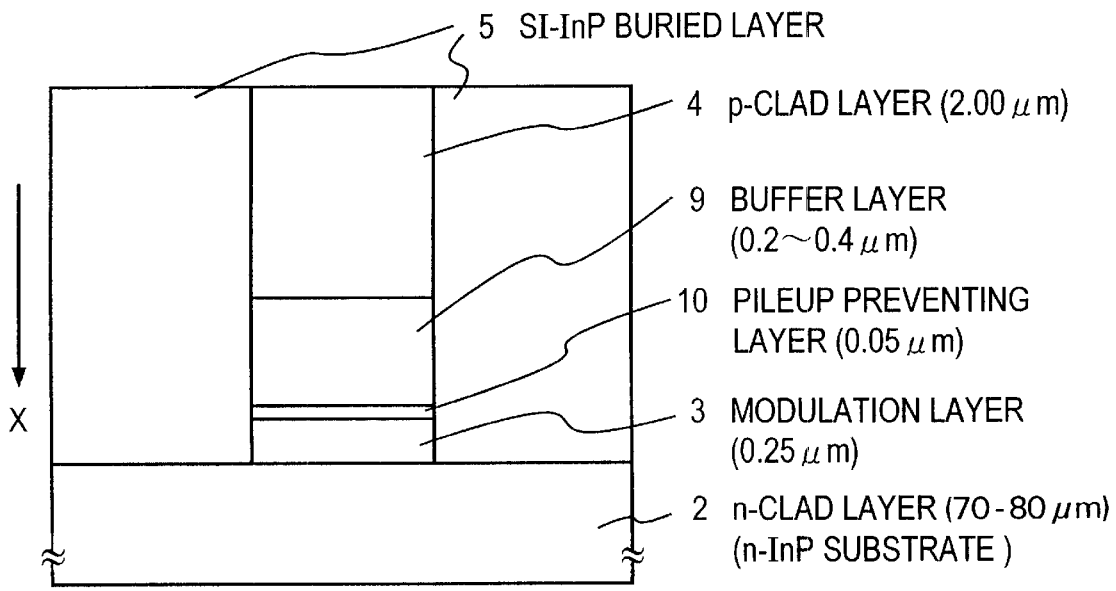
FIG. 4 is an end surface view showing the general construction of a second embodiment of the optical modulator according to the present invention.

FIG. 4 is an end surface view showing the general construction of a second embodiment of the optical modulator according to the present invention, and shows only an n-type clad layer 2, a modulation layer 3, a pileup preventing layer 10, a buffer layer 9, a p-type clad layer 4 and a semi-insulating buried layer 5 that are regions constituted by semiconductor materials. Like the prior optical modulator shown in FIG. 10, in the illustrated optical modulator, a stripe-like lamination of four-layer structure that comprises the stripe-like modulation layer 3, the pileup preventing layer 10 formed on the top surface of the stripe-like modulation layer 3, the buffer layer 9 formed on the top surface of the pileup preventing layer 10, and the p-type clad layer 4 formed on the top surface of the buffer layer 9 is formed on the top surface of the n-type clad layer 2 that is the n-type InP substrate. Further, in FIG. 4, a direction in thickness from the p-type clad layer 4 that is the uppermost layer of the optical modulator toward the n-type clad layer 2 that is the lowermost layer thereof is defined to X as shown in FIG. 4 by an arrow.

One example of thickness of each of these layers is as follows. As shown in the figure, thickness of the n-type clad layer 2 is 70–80 µm that is the same as that of the prior optical modulator, thickness of the modulation layer 3 is 0.10 µm that is also the same as that of the prior optical modulator, thickness of the pileup preventing layer 10 is 0.05 µm that is also the same as that of the prior optical modulator, thickness of the buffer layer 9 is 0.2–0.4 µm that is different from that of the prior optical modulator, and thickness of the p-type clad layer 4 is 2.00 µm that is the same as that of the prior optical modulator. Therefore, thickness of the semi-insulating buried layer 5 is the sum (2.35–2.55 µm) of the modulation layer 3 (0.10 µm), the pileup preventing layer 10 (0.05 µm), the buffer layer 9 (0.2–0.4 µm) and the p-type clad layer 4 (2.00 µm). Consequently, it will be understood that thickness of the buffer layer 9 is different from that of the prior optical modulator. Dopants are Zn and Se that are the same as those of the prior optical modulator.

Materials and band gap energies of the above-mentioned layers are shown in the following Table 4. Here, the band gap energies of the p-type clad layer 4, the buffer layer 9, the pileup preventing layer 10, the modulation layer 3 and the n-type clad layer 2 are shown by (1), (2), (5), (3) and (4), respectively.

TABLE 4

| Name | Material | Band Gap Energy [meV] | Remarks (Dopant) |
| --- | --- | --- | --- |
| p-type clad layer | p-InP | (1) 1350 | Zn |
| buffer layer | InGaAsP | (2) 1150 | |
| pileup preventing layer | InGaAsP | (5) 850–1150 | |
| modulation layer | InGaAsP | (3) 850 | |
| n-type clad layer | n-InP | (4) 1350 | Se |

From the above Table 4, it will be comprehended that in the second embodiment of the optical modulator, the modulation layer 3, the pileup preventing layer 10 and the buffer layer 9 are formed of the same material (InGaAsP), and that the band gap energy (2) of the buffer layer 9 is lower than that (1) of the p-type clad layer 4 and higher than that (3) of the modulation layer 3.

Figure 5:
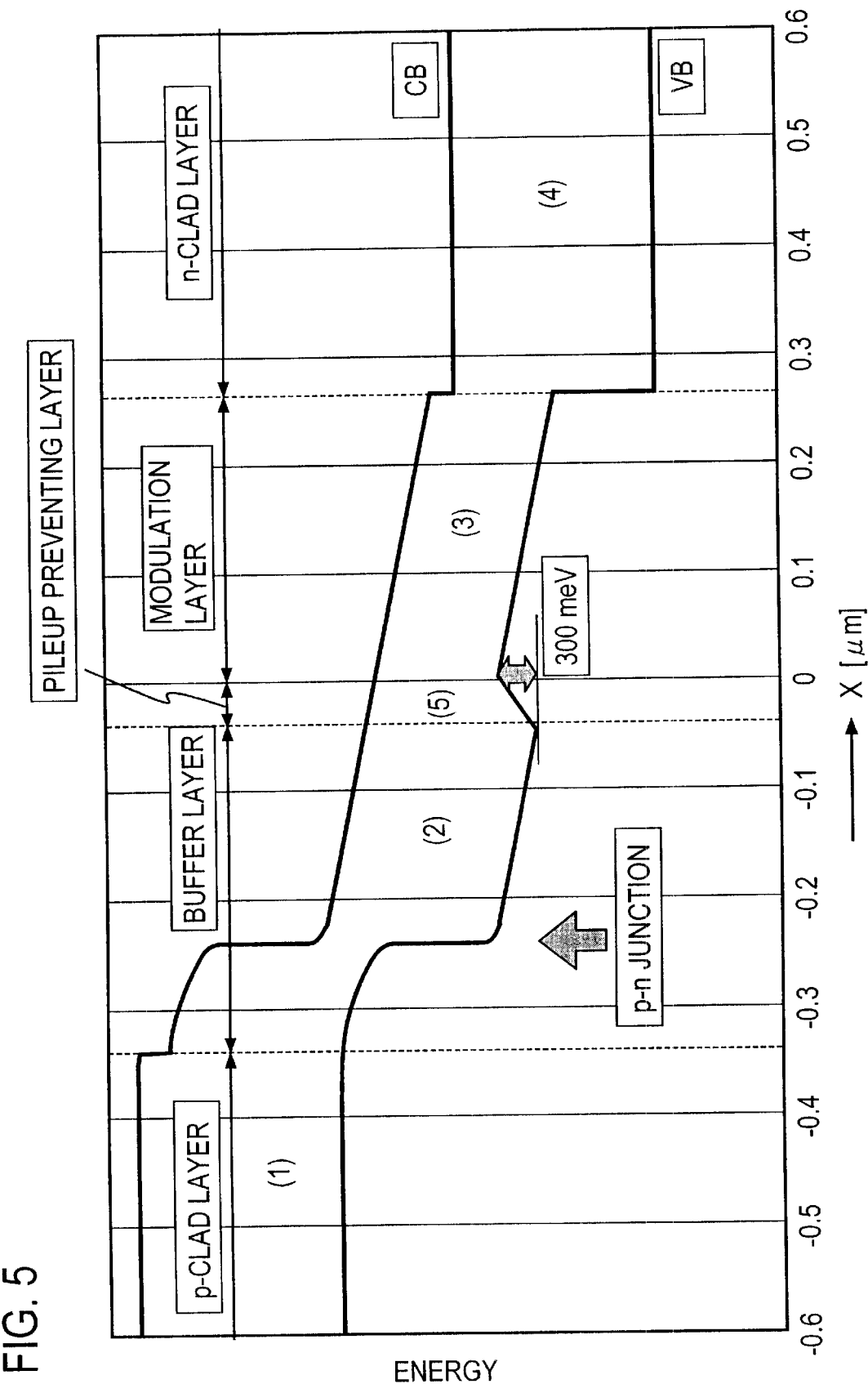
FIG. 5 is an energy band diagram of the second embodiment of the optical modulator shown in FIG. 4.

An energy band diagram relative to the thickness direction X of the optical modulator in which the band gap energy and thickness of each layer are set as mentioned above and the materials shown in Table 4 are used, is as shown in FIG. 5, for example. As is clear from this energy band diagram, in the second embodiment of the optical modulator shown in FIG. 4, too, the p-n junction is created in the buffer layer 9 near the interface between the buffer layer 9 and the p-type clad layer 4. When the p-n junction is produced in the buffer layer 9, an energy region of high level is produced at the neighborhood of the interface between the pileup preventing layer 10 and the modulation layer 3 in the valence band VB. However, since the band gap energy (5) of the pileup preventing layer 10 has varied from the band gap energy (3) of the modulation layer 3 to the band gap energy (2) of the buffer layer 9 in an inclination manner as well as the band gap energy (2) of the buffer layer 9 is set to a value lower than that (1) of the p-type clad layer 4 and higher than that (3) of the modulation layer 3, as shown in FIG. 5, there is produced only a difference in energy level that is more gentle in inclination than that of the prior optical modulator shown in FIG. 10 between the interface between the pileup preventing layer 10 and the modulation layer 3 and the p-n junction. Giving a concrete example, in the prior optical modulator shown in FIG. 10, a difference in energy level of 400 meV has been produced, whereas in the second embodiment of the optical modulator, a difference in energy level of 300 meV has been produced, which results in an advantage that the difference in energy level is decreased by as much as 100 meV in the second embodiment of the optical modulator.

Figure 10:
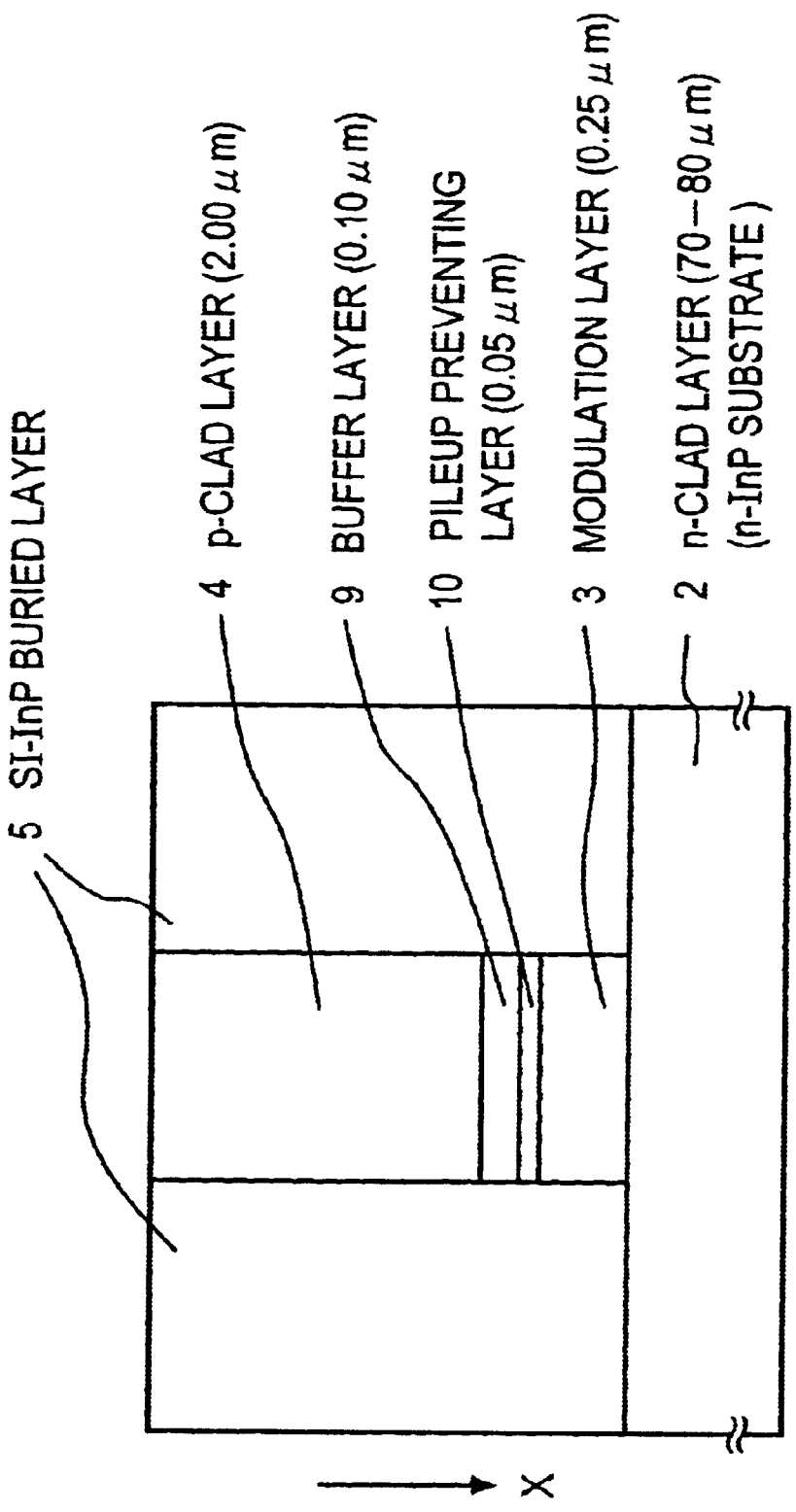
FIG. 10 is an end surface view showing regions constituted by semiconductor materials of another example of the prior optical absorption type semiconductor optical modulator.
Figure 11:
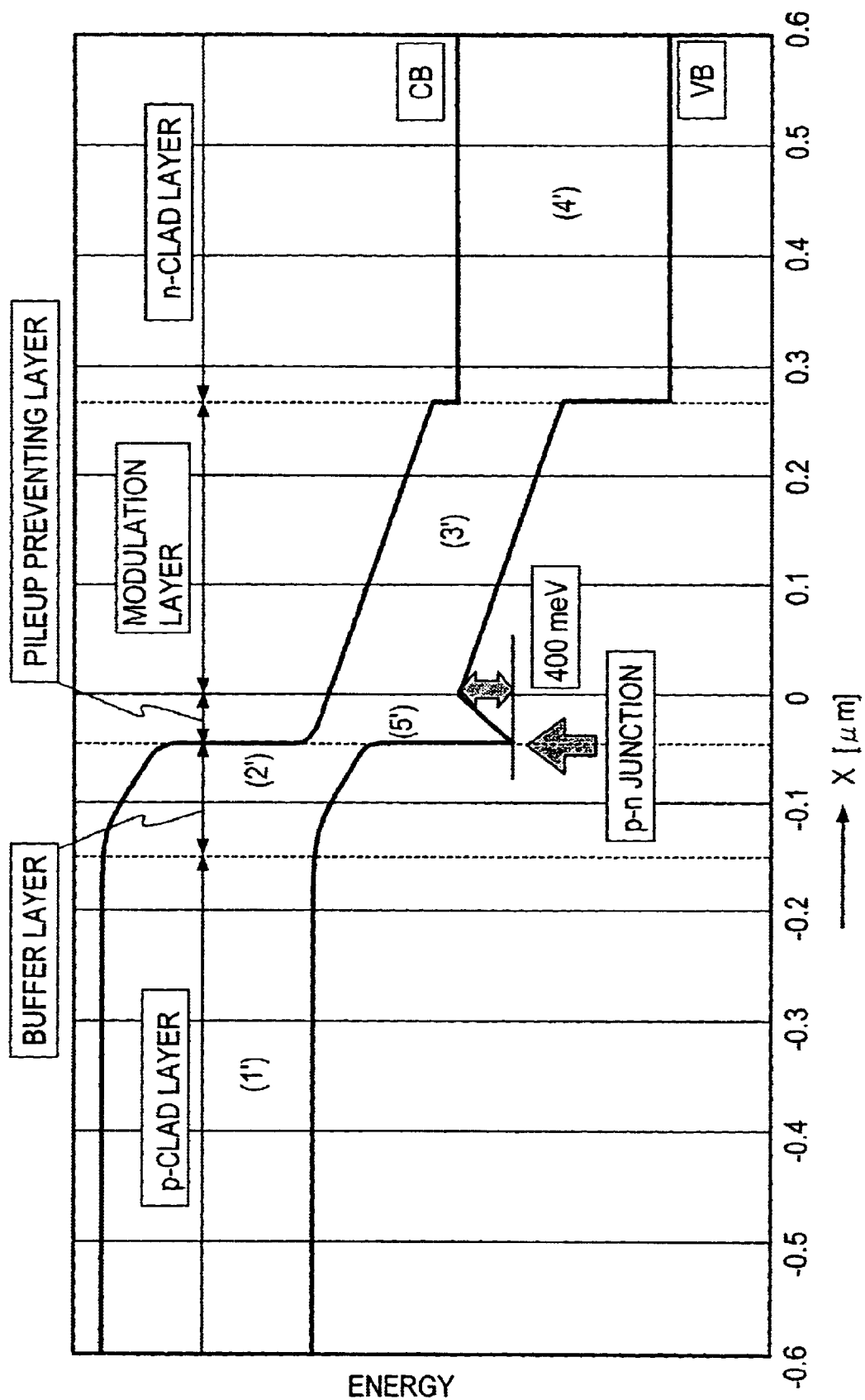
FIG. 11 is an energy band diagram of the prior optical modulator shown in FIG. 10.

In this manner, according to the second embodiment of the optical modulator, since inclination of the difference in energy level produced between the p-n junction and the interface between the pileup preventing layer 10 and the modulation layer 3 comes to more gentle as compared with that of the prior optical modulator shown in FIG. 10, and moreover, the difference in energy level is reduced, positive holes produced in the valence band VB are easy to move toward the p-type clad layer 4. As a result, the number of positive holes that are piled up at the interface between the modulation layer 3 and the pileup preventing layer 10 and the neighborhood thereof is considerably decreased.

In addition, it is possible that the buffer layer 9 can be made of the same material (InGaAsP) as that of the modulation layer 3 and the pileup preventing layer 10. For this reason, in case of forming the buffer layer 9, though in the prior optical modulator, it is required that Ga and As are controlled until they become nearly zero, thereby to supply only In and P, it is unnecessary to control Ga and As until they become nearly zero in the first and the second embodiments in which the buffer layer 9 is constituted by InGaAsP. Generally, in order to control supply of materials until the materials become nearly zero, the dynamic range of the control system raises a question. According to the constructions such as the first and second embodiments, such question does not occur, and hence the controllableness of composition in the inclined composition layer (the pileup preventing layer 10) is greatly improved.

Furthermore, since the number of positive holes piled up at the interface between the modulation layer 3 and the pileup preventing layer 10 and the neighborhood thereof is considerably decreased, it is possible to increase in thickness the buffer layer 9 as well as to produce the p-n junction in the buffer layer 9 near the interface between the buffer layer 9 and the p-type clad layer 4. Consequently, the width of a depletion layer is increased and the electrostatic capacity of the optical modulator is decreased. Accordingly, an optical modulator operating at a high speed such as 40 Gbps can be obtained, and will be used in, for example, high-speed, high-capacity optical fiber communications. Further, as is apparent from the energy band diagram shown in FIG. 5, in the second embodiment of the optical modulator shown in FIG. 4, only the modulation layer 3 contributes to optical absorption.

It is necessary that the band gap energy of the buffer layer 9 is set to a value within the limits in which quantity of light confinement does not vary greatly, and hence the proper band gap energy of the buffer layer 9 comes to a value that is larger by 300–400 meV than the band gap energy of the modulation layer 3. When such buffer layer 9 constructed as mentioned above is used, the p-n junction can be created in the buffer layer 9 near the interface between the buffer layer 9 and the p-type clad layer 4 so that the width of a depletion layer can be widened, the electrostatic capacity of the optical modulator can be decreased, and the frequency response characteristic cannot depend upon a voltage. Accordingly, an optical modulator operating at a high speed such as 40 Gbps can be obtained, and will be used in, for example, high-speed, high-capacity optical fiber communications.

In addition, in the optical absorption type semiconductor optical modulators, an optical absorption characteristic of each of the optical modulators varies, when a voltage is applied thereto, depending upon a difference between the wavelength (energy) of an incident light and the energy gap of the modulation layer 3. Therefore, in order to respond to light within the range of optical wavelengths used in the wavelength division multiplexing (WDM) communications, it is required to change the energy gap of the modulation layer 3 to correspond to each of the optical wavelengths. With the construction of the second embodiment of the optical modulator, whether the pileup phenomenon occurs or not depends upon a difference in energy between the modulation layer 3 and the buffer layer 9. Since each time the energy gap of the modulation layer 3 is changed corresponding to the wavelength of each incident light, the energy gap of the buffer layer 9 can be changed such that the difference in energy between the modulation layer 3 and the buffer layer 9 is maintained at constant, a drawback that effect of suppressing the pileup phenomenon depends upon the wavelength of an incident light can be removed, in addition to the improvement in controllableness of composition of the pileup preventing layer 10 interposed between the modulation layer 3 and the buffer layer 9 when the pileup preventing layer 10 is formed, as already discussed above.

In the first and second embodiments, on the top surface of the modulation layer 3 is provided a non-doped buffer layer portion the refractive index of which is somewhat lower than that of the modulation layer 3 and which is concerned with optical absorption in the first embodiment, the non-doped buffer layer portion being hardly concerned with optical absorption in the second embodiment and including the pileup preventing layer 10, and a p-type impurity diffused buffer layer portion the refractive index of which is also somewhat lower than that of the modulation layer 3, and which is hardly concerned with optical absorption. In addition, the p-type clad layer 4 the refractive index of which is lower than that of the buffer layer is provided on the top surface of a stripe-like lamination of the above-mentioned layers, and the n-type clad layer 2 the refractive index of which is lower than that of the buffer layer is provided on the bottom surface of the stripe-like lamination. For this reason, the distribution of mode field of a propagating light becomes asymmetrical, and the center of the distribution of mode field does not correspond to, the position of the modulation layer 3. Accordingly, there occurs a problem that the efficiency of optical coupling and the efficiency of optical absorption between the optical modulator and an optical fiber are somewhat lowered.

Figure 6:
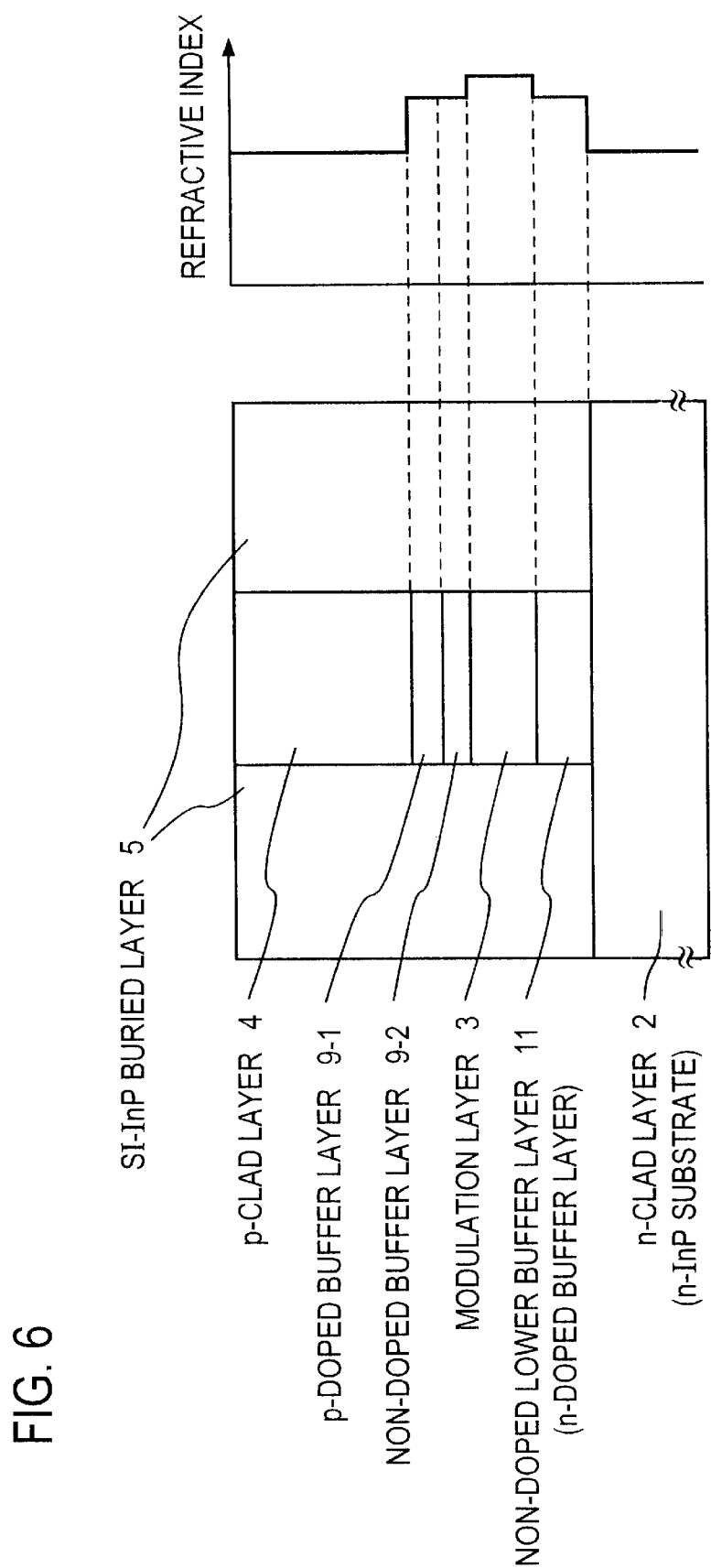
FIG. 6 is an end surface view showing the general construction of a third embodiment of the optical modulator according to the present invention and the distribution state of refractive index thereof.
Figure 7:
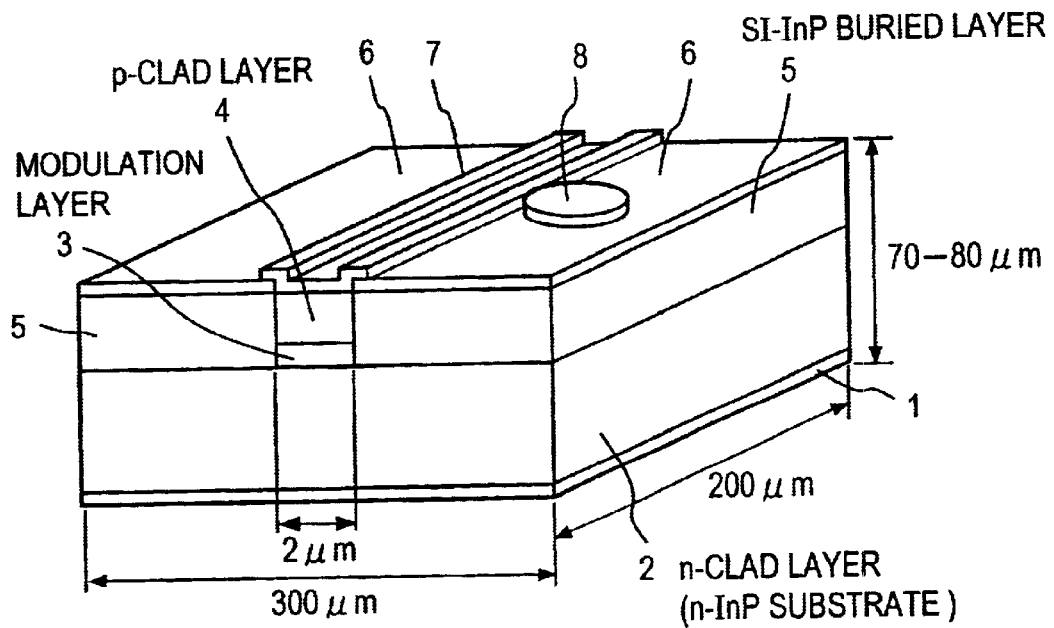
FIG. 7 is a perspective view showing the general construction of an example of the prior optical absorption type semiconductor optical modulator.

FIG. 6 is an end surface view showing the general construction of a third embodiment of the optical modulator according to the present invention and the distribution state of refractive index thereof. This third embodiment of the optical modulator is provided to overcome the above-mentioned problems that the distribution of mode field of a propagating light becomes asymmetrical and that the center of the distribution of mode field does not correspond to the position of the modulation layer 3.

As shown in FIG. 6, in this third embodiment, between the n-type clad layer 2 and the modulation layer 3 is formed a stripe-like non-doped lower buffer layer 11 having the same composition as that of the buffer layer 9 interposed between the modulation layer 3 and the p-type clad layer 4. It is preferable that thickness of the lower buffer layer 11 is set to the same value as that of the buffer layer 9. The buffer layer 9 formed on the top surface of the modulation layer 3 is shown as two buffer layers one of which is a p-type impurity diff-used buffer layer 9-1 adjacent to the p-type clad layer 4 and the other of which is a non-doped buffer layer 9-2 (including the pileup preventing layer 10) into which the p-type impurity is not diffused adjacent to the modulation layer 3. Further, in FIG. 6, portions and elements corresponding to those in FIGS. 1 and 4 are denoted by the same reference characters or numbers affixed thereto, and explanation thereof will be omitted unless necessary.

With the construction as described above, as is clear from the distribution diagram of the refractive index shown in FIG. 6, the refractive index of both the buffer layers 9-1 and 9-2 on the top surface of the modulation layer 3 comes to the same as that of the buffer layer 11 on the bottom surface of the modulation layer 3, and hence the distribution of the refractive index of a lamination of the above-mentioned layers in the direction of layer-built can be made symmetrical in top and bottom thereof. As a result, the distribution of mode field of a propagating light becomes symmetrical, and it is possible to cause the center of the mode field distribution to correspond to the position of the modulation layer 3. Accordingly, an optical loss can be reduced without damaging the pileup preventing effect of the optical modulator at all, and the extinction ratio (signal-to-noise ratio) can be improved. Moreover, in the third embodiment, since the lower buffer layer 11 is formed as a non-doped layer, the width of a depletion layer can be more and more widened, and hence the electrostatic capacity of the optical modulator can be further decreased. As a result, the frequency response characteristic of the optical modulator is still more improved, and since a change of optical absorption in the low bias region comes to gentle, the eye-diagram in mark portions can be improved.

Further, in the above third embodiment, though the stripe-like non-doped lower buffer layer 11 having the same composition as that of the buffer layer 9 interposed between the modulation layer 3 and the p-type clad layer 4 is interposed between the n-type clad layer 2 and the modulation layer 3, a stripe-like buffer layer into which an n-type impurity is doped may be interposed between the n-type clad layer 2 and the modulation layer 3, or two layers of a stripe-like n-type impurity doped buffer layer and a stripe-like non-doped lower buffer layer may be interposed between the n-type clad layer 2 and the modulation layer 3, and the same functions and effects as in the case of the above-mentioned third embodiment can be obtained. It is preferable that the n-type impurity doped buffer layer and the non-doped lower buffer layer have the same composition as that of the buffer layer 9. In case that the above two layers are interposed between the n-type clad layer 2 and the modulation layer 3, it is preferred that the stripe-like n-type impurity doped buffer layer is inserted on the top surface of the n-type clad layer 2.

As is apparent from the foregoing explanation, according to the present invention, in the optical modulator having no pileup preventing layer provided therein, since the band gap energy of the buffer layer is set to the sum of the band gap energy of the modulation layer and the acceptor level produced due to diffusion of a p-type dopant into the buffer layer, the p-n junction is created in the buffer layer near the interface between the buffer layer and the p-type clad layer. Moreover, a difference in energy level that is steep in inclination cannot be created between the interface between the buffer layer and the modulation layer and the p-n junction. As a result, positive holes produced in the valence band move toward the p-type clad layer 4 without piling up at the interface between the buffer layer and the modulation layer and the neighborhood thereof. Accordingly, there does not occur the drawback that the voltage (electric field) applied to the optical modulator is canceled out, and hence the efficiency of optical absorption is increased so that ON and OFF of an electric signal can faithfully be converted into high intensity optical signal and low intensity optical signal or ON and OFF of an optical signal corresponding thereto. Consequently, the signal waveform in modulating operation is not deteriorated, and an electric signal can be correctly converted into an optical signal. In addition, the frequency response characteristic does not depend upon a voltage. Furthermore, since the p-n junction is created in the buffer layer near the interface between the buffer layer and the p-type clad layer, the width of a depletion layer is widened and the electrostatic capacity of the optical modulator is decreased. Therefore, an optical modulator operating at a high speed such as 40 Gbps can be obtained, and will be used in, for example, high-speed, high-capacity optical fiber communications.

On the other hand, in the optical modulator having a pileup preventing layer provided therein, since the band gap energy of the buffer layer is set to a value lower than that of the p-type clad layer and higher than that of the modulation layer, a difference in energy level produced between the interface between the pileup preventing layer and the modulation layer and the p-n junction is reduced, and positive holes produced in the valence band are easy to move toward the p-type clad layer. As a result, the pileup of positive holes is decreased. In addition, since the p-n junction can be produced in the buffer layer near the interface between the buffer layer and the p-type clad layer, the width of a depletion layer is increased and the electrostatic capacity of the optical modulator is decreased. Accordingly, an optical modulator operating at a high speed such as 40 Gbps can be obtained, and will be used in, for example, high-speed, high-capacity optical fiber communications.

Moreover, since the lower buffer layer having the same composition as that of the buffer layer interposed between the modulation layer and the p-type clad layer is provided between the n-type clad layer and the modulation layer thereby to make symmetrical the distribution of the refractive index of the optical modulator in the direction of layer-built in top and bottom thereof, the distribution of mode field of a propagating light becomes symmetrical. In addition, it is possible to cause the center of the mode field distribution to correspond to the position of the modulation layer, and therefore, an optical loss can be reduced without damaging the pileup preventing effect of the optical modulator at all as well as the extinction ratio (signal-to-noise ratio) can be improved. Further, since the lower buffer layer is formed as a non-doped layer, the width of a depletion layer can be more and more widened, and hence the electrostatic capacity of the optical modulator can be further decreased. As a result, an optical modulator operating at a high speed such as 40 Gbps can be obtained, and will be used in, for example, high-speed, high-capacity optical fiber communications. Furthermore, the frequency response characteristic is improved, and since a change of optical absorption in the low bias region comes to gentle, the eye-diagram in mark portions can be improved.

While the present invention has been described with regard to the preferred embodiments shown by way of example, it will be apparent to those skilled in the art that various modifications, alterations, changes, and/or minor improvements of the embodiments described above can be made without departing from the spirit and the scope of the present invention. Accordingly, it should be understood that the present invention is not limited to the illustrated embodiments, and is intended to encompass all such modifications, alterations, changes, and/or minor improvements falling within the scope of the invention defined by the appended claims.

What is claimed is:

1. An optical modulator comprising:
   an n-type clad layer of a predetermined shape;
   a stripe-like modulation layer that is elongated in the direction of light propagation and is formed on the top surface of the n-type clad layer;
   a stripe-like buffer layer that is formed on the top surface of the stripe-like modulation layer;
   a stripe-like p-type clad layer that is formed on the top surface of the stripe-like buffer layer and has a p-type acceptor level; and wherein
   the buffer layer has its composition the band gap energy of which is higher by an energy due to the p-type acceptor level than the band gap energy of the modulation layer.

2. The optical modulator as set forth in claim 1, wherein an n-type layer is provided between the modulation layer and the n-type clad layer, the band gap energy of said n-type layer being higher by a level formed by a p-type impurity than the band gap energy of the modulation layer.

3. The optical modulator as set forth in claim 1, wherein a non-doped layer is provided between the modulation layer and the n-type clad layer, the band gap energy of said n-type layer being higher by a level formed by a p-type impurity than the band gap energy of the modulation layer.

4. The optical modulator as set forth in claim 1, wherein two layers of an n-type layer and a non-doped layer are provided between the modulation layer and the n-type clad layer, the band gap energy of said two layers being higher by a level formed by a p-type impurity than the band gap energy of the modulation layer.

5. An optical modulator comprising:
   an n-type clad layer of a predetermined shape;
   a stripe-like modulation layer that is elongated in the direction of light propagation and is formed on the top surface of the n-type clad layer;
   a stripe-like pileup preventing layer the band gap energy of which varies in inclination manner and that is formed on the top surface of the stripe-like modulation layer;
   a stripe-like buffer layer that is formed on the top surface of the stripe-like pileup preventing layer;
   a stripe-like p-type clad layer that is formed on the top surface of the stripe-like buffer layer; and wherein
   the band gap energy of the buffer layer is set to a value lower than the band gap energy of the p-type clad layer and higher than the band gap energy of the modulation layer.

6. The optical modulator as set forth in claim 5, wherein an n-type layer is provided between the modulation layer and the n-type clad layer, the band gap energy of said n-type layer being higher by a level formed by a p-type impurity than the band gap energy of the modulation layer.

7. The optical modulator as set forth in claim 5, wherein a non-doped layer is provided between the modulation layer and the n-type clad layer, the band gap energy of said n-type layer being higher by a level formed by a p-type impurity than the band gap energy of the modulation layer.

8. The optical modulator as set forth in claim 5, wherein two layers of an n-type layer and a non-doped layer are provided between the modulation layer and the n-type clad layer, the band gap energy of said two layers being higher by a level formed by a p-type impurity than the band gap energy of the modulation layer.

* * * * *